(12) United States Patent
Reisel et al.

(10) Patent No.: US 7,114,254 B2
(45) Date of Patent: Oct. 3, 2006

(54) METAL PLATE GASKET

(75) Inventors: Robert M. Reisel, Prospelt, IL (US);
Thomas O. Zurfluh, Evanston, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 419 days.

(21) Appl. No.: 10/718,935

(22) Filed: Nov. 20, 2003

(65) Prior Publication Data
US 2004/0098859 A1   May 27, 2004

Related U.S. Application Data

(62) Division of application No. 10/158,814, filed on May 31, 2002, now Pat. No. 6,682,079.

(51) Int. Cl.
*B21D 53/84* (2006.01)
(52) U.S. Cl. .................. 29/888.3; 29/451; 29/452; 277/590
(58) Field of Classification Search ........... 29/888.061, 29/451, 452, 888.3; 277/590, 591, 598, 628
See application file for complete search history.

(56) References Cited

U.S. PATENT DOCUMENTS

| | | | |
|---|---|---|---|
| 2,009,324 A | 7/1935 | Pullin | |
| 3,091,025 A | 5/1963 | Zallea | |
| 3,279,235 A * | 10/1966 | Olson | 72/324 |
| 3,313,553 A | 4/1967 | Gastineau | |
| 3,532,349 A * | 10/1970 | Czernik | 277/598 |
| 3,713,660 A | 1/1973 | Luthe | |
| 3,970,322 A | 7/1976 | Stecher et al. | |
| 4,098,495 A | 7/1978 | Lhenry et al. | |
| 4,114,907 A * | 9/1978 | Abbes et al. | 277/647 |
| 4,311,318 A | 1/1982 | Czernik et al. | |
| 4,331,336 A | 5/1982 | Czernik et al. | |
| 4,369,980 A * | 1/1983 | Backlin | 277/593 |
| 4,605,236 A * | 8/1986 | Tsuchihashi et al. | 277/598 |
| 4,852,893 A | 8/1989 | Wesley | |
| 4,859,542 A | 8/1989 | Begg et al. | |
| 5,033,426 A | 7/1991 | Reichenbach et al. | |
| 5,076,592 A * | 12/1991 | Pearlstein | 277/593 |
| 5,158,305 A | 10/1992 | Halling | |
| 5,395,127 A * | 3/1995 | Miyaoh | 577/595 |
| 5,517,958 A | 5/1996 | Iikura | |
| 5,713,582 A | 2/1998 | Swensen et al. | |

(Continued)

FOREIGN PATENT DOCUMENTS

JP         359001873 A  *  1/1984  ............... 277/388

Primary Examiner—Marc Jimenez
(74) Attorney, Agent, or Firm—Robert L. Stearns; Dickinson Wright PLLC

(57) ABSTRACT

A metal gasket assembly has a gasket plate and an annular grommet. The gasket plate is formed with an opening having opposing surfaces adjacent the opening to define a predetermined fixed thickness of a plate. The annular grommet has an elastically deformable U-shaped body. The U-shaped body has legs presenting outer sealing surfaces defining an initial undeformed thickness that is greater than the thickness of the gasket plate. The opening formed in the gasket plate receives the grommet. A compressive force applied in a generally perpendicular direction to the opposing surfaces of the gasket plate deform the legs of the body to a reduced thickness corresponding substantially to the thickness of the gasket plate. When the compressive force is reduced with changes in operating conditions, the legs of the grommet return toward their original undeformed thickness to maintain a seal.

7 Claims, 1 Drawing Sheet

U.S. PATENT DOCUMENTS

| | | |
|---|---|---|
| 5,730,444 A | 3/1998 | Notter |
| 5,730,448 A | 3/1998 | Swensen et al. |
| 5,735,532 A | 4/1998 | Nolan et al. |
| 5,840,136 A | 11/1998 | Maruki et al. |
| 5,934,682 A * | 8/1999 | Miszczak et al. ........... 277/313 |
| 6,015,152 A | 1/2000 | Swensen et al. |
| 6,048,418 A * | 4/2000 | Canner ....................... 148/589 |
| 6,247,703 B1 | 6/2001 | Forry et al. |
| 6,409,180 B1 | 6/2002 | Spence et al. |
| 6,422,572 B1 | 7/2002 | Ueda et al. |
| 6,536,778 B1 | 3/2003 | Behil et al. |
| 6,905,125 B1 * | 6/2005 | Shibata et al. .............. 277/626 |

* cited by examiner

METAL PLATE GASKET

This application is a division of U.S. application Ser. No. 10/158,814, filed May 31, 2002, now U.S. Pat. No. 6,682,079.

BACKGROUND OF THE INVENTION

1. Field of the Invention

This invention relates generally to metal plate gaskets for use in heavy duty diesel engine applications, and more particularly to the sealing of the combustion chambers of such engines.

2. Related Art

Metal plate gaskets of conventional construction for use in sealing a cylinder head to a block of a heavy duty diesel engine include a solid metal plate formed with a plurality of openings corresponding to various fluid passages communicating between the head and block. At least one of the openings is a combustion opening which surrounds a piston cylinder of the block. A fire ring of copper or the like is set in the plate opening and is crushed to the thickness of the plate as the head is bolted to the block. The fire ring serves to seal the combustion opening against leakage. The plate serves to limit the plastic deformation of the fire ring. One drawback to such fire rings is that they do not recover their shape of the load is removed or decreased. During operation of the engine, the load applied between the head and block varies depending upon the stroke cycle and operating temperature, presenting an opportunity for the head or block to draw away from the fire ring and thus decreasing the sealing effectiveness of such rings.

Other metal plate gasket constructions utilize a conventional, plastically deformable fire ring wrapped in a metal armoring of steel. The steel armor thus relies on the strength and plastic deformation properties of the fire crush ring core to achieve sealing, and thus shares the same deficiencies as the fire ring described previously.

SUMMARY OF THE INVENTION

A metal gasket assembly according to the invention comprises a metal gasket plate formed with an opening and having opposing surfaces adjacent the opening to define a predetermined fixed thickness of a plate. An annular grommet is formed separately from the gasket plate from a heat treatable metal so as to be elastically deformable after heat treatment. The grommet has a generally U-shaped body in cross section defining a pair of legs. The legs have outer sealing surfaces spaced a predetermined distance apart to define an initial undeformed thickness that is greater than the thickness of the gasket plate. The opening formed in the gasket plate receives the annular grommet. In use, a compressive force is applied in a generally perpendicular direction to the opposing surfaces of the gasket plate to elastically deform the legs of the body to a reduced thickness corresponding substantially to the thickness of the gasket plate. When the compressive force is released, the legs of the annular grommet return substantially to their original undeformed thickness.

One advantage of the present invention is that the elastically deformable gasket is able to flex with changing load conditions so as to maintain a high integrity seal between a head and block of an engine. As the compressed air/fuel mix burns, its pressure has the tendency to lift the head away from the block, thus lessening the load on the grommet. The grommet responds to such changing conditions by expanding axially under the decreasing load toward recovery of its elastic deformation. As the cycle continues, the grommet is again reloaded and compressed elastically to maintain uniform sealing.

Another advantage of the present invention is that the grommets are made out of less costly material than conventional copper fire rings and may be simply constructed from sheet stock material by suitable stamping and punching operations.

Still another advantage of the present invention is that the elastically deformable grommets may be re-used since they recover their shape on unloading and return to an elastically compressed state upon re-loading.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
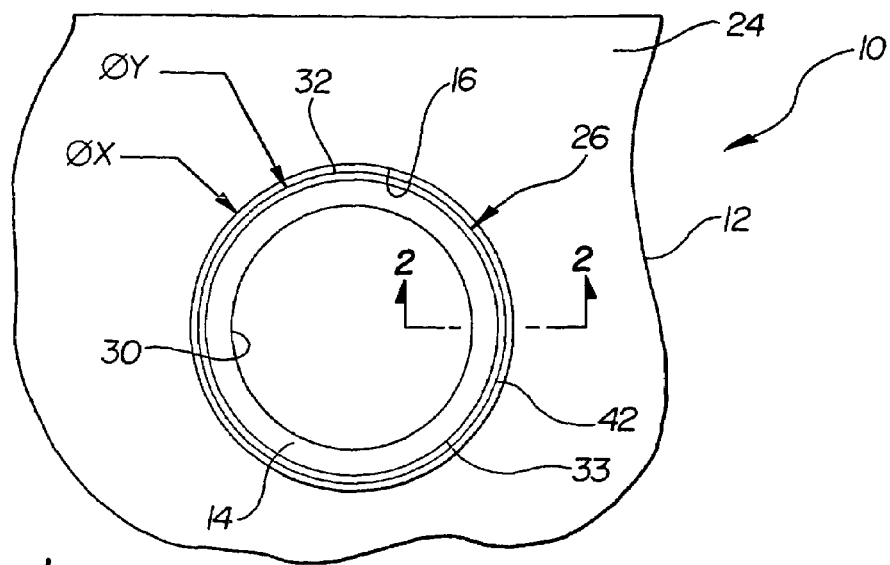
FIG. 1 is a fragmentary plan view of a metal gasket assembly constructed according to a presently preferred embodiment of the invention.

A metal gasket assembly 10, as shown in FIG. 1, has a gasket plate 12 and a grommet 14. The gasket plate 12 has an opening 16 and a fixed thickness A of the gasket plate 12. The grommet 14 is generally U-shaped in cross section with a pair of legs 18, 20 having a portion defining an undeformed thickness B being generally greater than the thickness A of the gasket plate 12. The grommet 14 is received in the opening 16 of the gasket plate 12. In use, the legs 18, 20 of the grommet 14 are deformed by a compressive force such that the legs 18, 20 deform generally to the thickness A of the gasket plate 12 while remaining in a purely elastic state.

Figure 2:
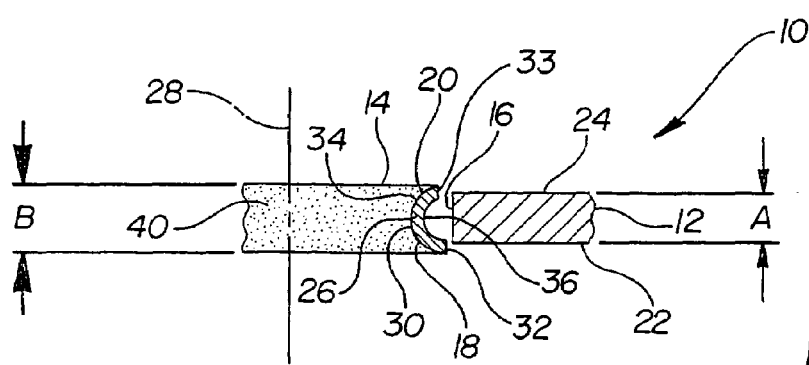
FIG. 2 is an enlarged fragmentary cross sectional view taken generally along lines 2—2 of FIG. 1 showing the gasket assembly in an uncompressed state.
Figure 3:
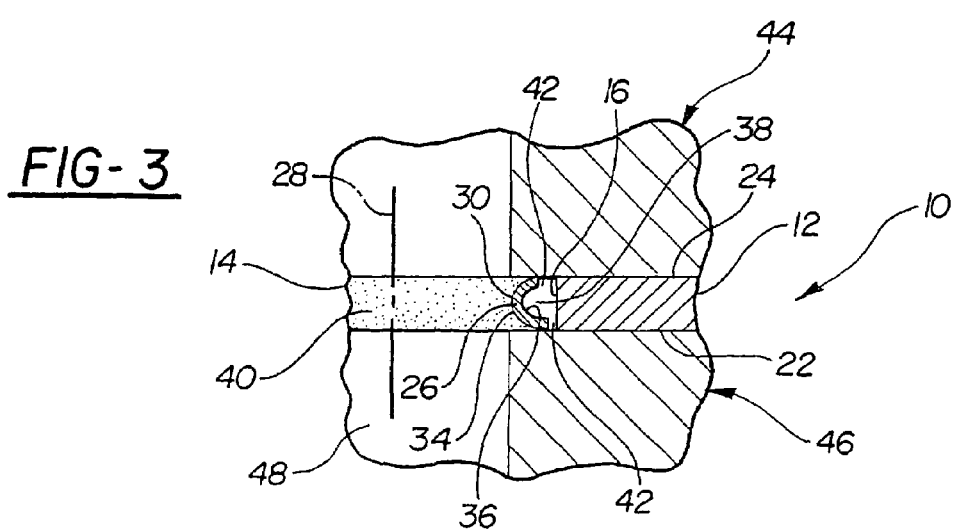
FIG. 3 is a view like FIG. 2 but showing the gasket assembly compressed between a head and block of an engine.

The gasket plate 12, as best shown in FIGS. 2 and 3, is preferably stamped or forged from a generally incompressible material, preferably steel. The opening 16 formed in the gasket plate 12 has a predetermined diameter X and thickness A, where the thickness A is defined by the opposing sides 22, 24 adjacent the opening 16 of the gasket plate 12. Any number of openings 16 can be formed in the gasket plate 12 depending on the number of grommets 14 required in the particular application.

The grommet 14, as best shown in FIGS. 2 and 3, is formed separately from the gasket plate 12 and from a ferrous, preferably medium to high carbon sheet of metal. The sheet of metal is stamped in a pre-heat treated condition to form an annular body 26 being generally U-shaped in cross section taken along a plane running along an axis 28 of the grommet 14. The legs 18, 20 extend outwardly from the axis 28 and preferably diverge from an arcuate portion 30 of the U-shaped body 26 and extend to form end portions 32, 33. The opposing external sides 26 of the legs 18, 20 form a convex surface 34 and an inner portion forms a concave surface 36. Generally at the end portions 32, 33, the opposing external sides 26 of the legs 18, 20 are spaced a predetermined distance apart corresponding to and greater than the initial thickness A of the gasket plate 12. The concave surface 36 of the grommet 14 defines a space 38 that is free from any compression limiting materials such that the legs 18, 20 are unsupported and free to deform upon application of a compressive force.

Upon forming the grommet 14 into its finished shape in a non-heat treated condition, the grommet 14 is heat treated, preferably using an austempered heat treat cycle providing for a bainitic microstructure. The heat treating cycle imparts strength and resilience to the grommet 14 so that the grommet 14 remains fully elastic throughout the compression range, while in use. Therefore, upon removal of the compressive force from the grommet 14, the grommet 14 returns to its initial undeformed thickness B. Upon heat treating the grommet 14, a seal coating such as NBR or PTFE material or the like, is applied to the body 26 of the grommet 14 to at least cover the convex surface 34 of the body 26 to provide a sealing surface 40 on the body 26 of the grommet 14.

After forming, heat treating and coating the grommet 14, the grommet 14 is disposed in the opening 16 of the gasket plate 12. The grommet 14 is preferably spaced radially from the wall of the opening 16 in which it is installed to provide an annular gap or space 42. The space 42 reduces heat transfer between the grommet 14 and the gasket plate 12 and provides room for the grommet 14 to expand when heated.

In use, as best shown in FIG. 3, the gasket assembly 10 is placed between a cylinder head 44 and an engine block 46 with the grommet 14 surrounding a combustion cylinder 48 of the engine block 46. The head 44 is bolted to the block 46, thus causing the legs 18, 20 of the grommet 14 to be deformed by a compressive force until the head 44 and the block 46 of the engine are separated by the thickness Y of the gasket plate 12 to seal the combustion cylinder 48. When the legs 18, 20 of the grommet 14 are deformed to the thickness Y of the gasket plate 12, they remain in an elastic state so that when the head 44 is removed from the block 46 of the engine, the legs 18, 20 return generally to their initial undeformed thickness X. Under changing load conditions, the gasket 14 maintains a seal about the combustion cylinder 48.

When the legs 18, 20 of the grommet 14 are compressed between the head 44 and the block 46 of the engine, the coating on the legs 18, 20 of the grommet 14 creates a seal between the grommet 14, the head 44 and the block 46 of the engine. The seal generated between the head 44 and block 46 is fostered by the legs 18, 20 being biased against the head 44 and block 46 by the force created as a result of the legs 18, 20 remaining in an elastic state. The seal is dynamic in that it is maintained with changing compressive loads on the gasket.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of manufacturing a metal gasket assembly, comprising:

providing a plate having opposite sides with an opening therethrough, said sides defining a thickness corresponding to a compressed thickness of said gasket assembly;

forming an annular grommet having a generally U-shaped cross-section defining a pair of axially spaced legs having outer axially opposite sealing surfaces spaced a predetermined distance apart when in an undeformed state corresponding to an initial thickness of the grommet which is greater than said thickness of the plate;

installing the grommet in the opening of the plate; and wherein the grommet is fabricated of a heat-treatable ferrous-based metal material and is formed to the annular, U-shaped cross-sectional configuration when the grommet material is in a relatively soft, plastically deformable pre-heated condition, and where after forming, the grommet is subjected to a heat treatment to impart elasticity and strength properties to the grommet enabling the legs of the grommet to be compressed elastically under an axial compression load to a reduced thickness corresponding substantially to the thickness of the plate and to return to the initial thickness upon removal of the compressive load.

2. The method of claim 1 wherein the heat treatment step has an austemper heat treat cycle.

3. The method of claim 1 wherein the pair of legs are formed such that one of the legs is formed longer than the other leg.

4. The method of claim 1 further comprising applying a coating to the grommet after the heat treatment step.

5. The method of claim 1 further including defining an annular gap between said grommet and said plate during the installation step.

6. The method of claim 1 further including forming said legs having free ends, said free ends being spaced radially inwardly from said opening after said installation step.

7. The method of claim 1 further including defining a space between said legs said space being free from any compression limiting materials such that said legs are free to elastically deform under the compression load.

* * * * *

UNITED STATES PATENT AND TRADEMARK OFFICE
CERTIFICATE OF CORRECTION

PATENT NO. : 7,114,254 B2  Page 1 of 1
APPLICATION NO. : 10/718935
DATED : October 3, 2006
INVENTOR(S) : Robert M. Reisel and Thomas O. Zurfluh It is certified that error appears in the above-identified patent and that said Letters Patent is hereby corrected as shown below:

Column 1, line 27: "shape of the load" should be --shape if the load--.

Signed and Sealed this

Sixth Day of March, 2007

JON W. DUDAS
*Director of the United States Patent and Trademark Office*